(12) United States Patent
Ding et al.

(10) Patent No.: US 11,767,480 B1
(45) Date of Patent: Sep. 26, 2023

(54) METHODS OF UPGRADING HYDROCARBON FEED STREAMS

(71) Applicant: Saudi Arabian Oil Company, Dhahran (SA)

(72) Inventors: Lianhui Ding, Dhahran (SA); Saad Al-Bogami, Dhahran (SA); Sameer A. Al-Ghamdi, Dhahran (SA); Duhaiman Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/973,024

(22) Filed: Oct. 25, 2022

(51) Int. Cl.
  *C10G 67/02* (2006.01)
  *B01D 3/14* (2006.01)
  *B01D 3/06* (2006.01)

(52) U.S. Cl.
  CPC .............. *C10G 67/02* (2013.01); *B01D 3/06* (2013.01); *B01D 3/14* (2013.01); *C10G 2300/1096* (2013.01); *C10G 2300/202* (2013.01); *C10G 2300/205* (2013.01); *C10G 2300/206* (2013.01); *C10G 2300/301* (2013.01); *C10G 2300/308* (2013.01); *C10G 2300/4006* (2013.01); *C10G 2300/4012* (2013.01); *C10G 2300/4018* (2013.01); *C10G 2400/30* (2013.01)

(58) Field of Classification Search
  CPC ............ C10G 67/02; C10G 2300/1096; C10G 2300/202; C10G 2300/205; C10G 2300/206; C10G 2300/301; C10G 2300/308; C10G 2300/4006; C10G 2300/4012; C10G 2300/4018; C10G 2400/30; B01D 3/06; B01D 3/14
  See application file for complete search history.

(56) References Cited

U.S. PATENT DOCUMENTS

| 4,302,323 A | 11/1981 | Chen |
| 4,485,004 A | 11/1984 | Fisher et al. |
| 8,197,668 B2 | 6/2012 | Ou et al. |

(Continued)

FOREIGN PATENT DOCUMENTS

| CN | 105567319 B | * | 7/2017 | |
| EP | 3744816 A1 | * | 12/2020 | ............. C10G 11/18 |

OTHER PUBLICATIONS

Jin et al., "Synergistic Process for FCC Light Cycle Oil efficient Conversion to Produce High-Octane Number Gasoline", Industrial & Engineering Chemistry Research, vol. 55, pp. 5108-5115, 2016.

(Continued)

*Primary Examiner* — Randy Boyer
*Assistant Examiner* — Juan C Valencia
(74) *Attorney, Agent, or Firm* — DINSMORE & SHOHL LLP

(57) ABSTRACT

This disclosure relates to methods of upgrading hydrocarbon feed stream, which can include separating the hydrocarbon feed stream into a heavy fraction and a light fraction, hydrotreating an aromatic feed stream with at least a first catalyst in a first reactor comprising hydrogen to produce a first product effluent, combining the heavy fraction with at least a portion of the first product effluent to form a mixed stream, and hydrotreating the mixed stream with one or more second catalysts in a second reactor comprising hydrogen to produce a second product effluent.

20 Claims, 1 Drawing Sheet

(56) References Cited

U.S. PATENT DOCUMENTS 8,741,129 B2    6/2014    Brown et al.
9,663,730 B2    5/2017    Wang et al.

OTHER PUBLICATIONS

Park et al., ":Promoting asphaltene conversion by tetralin for hydrocracking of petroleum pitch", Fuel, vol. 222, pp. 105-113, 2018.

Aleman-Vazquez et al., "Effect of tetralin, decalin and naphthalene as hydrogen donors in the upgrading of heavy oils", Procedia Engineering, vol. 42, pp. 523-539, 2012.

* cited by examiner

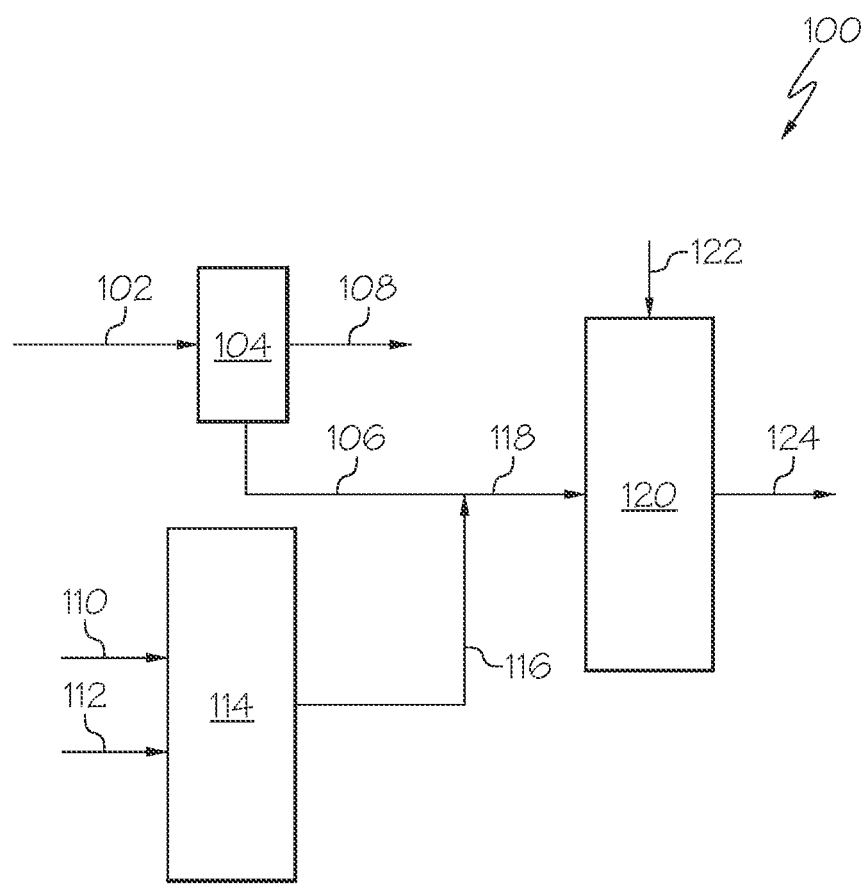

METHODS OF UPGRADING HYDROCARBON FEED STREAMS

FIELD

Embodiments disclosed herein generally relate to hydrocarbon processing, and more specifically to methods of upgrading a hydrocarbon feed stream.

TECHNICAL BACKGROUND

The worldwide increasing demand for upgraded feedstocks remain a major challenge for many integrated refineries. In particular, heavy oil hydroprocessing can be used to upgrade feedstocks. Hydroprocessing can utilize diffusion of hydrogen gas to the surface of a catalyst, which can then react with oil molecules on the active sites of the catalyst. However, if the catalyst activity is too high, the hydrogen can be quickly consumed, depriving the system of hydrogen. As a result, thermal cracking can increase as well as coke formation, which may deactivate the catalyst as coke is formed. Thus, conventional hydroprocessing reactions may be hindered by the depletion of available hydrogen and catalyst deactivation.

SUMMARY

There is an ongoing need for methods of upgrading hydrocarbon feed streams to produce higher value products. As is described herein, methods of upgrading a hydrocarbon feed stream may include hydrotreating an aromatic feed stream, combining the hydrotreated product with a heavy fraction of a feed stream, and hydrotreating the mixture to upgrade the feedstock. The mixing of a hydrotreated aromatic feed stream with a heavy fraction before hydrotreating the heavy fraction may improve the hydrogenation and hydroprocessing of the feedstock by providing a hydrogen donor solvent during the hydrotreating of the heavy fraction, which may improve the upgrading of the hydrocarbon feed stream in comparison to conventional methods that do not hydrotreater an aromatic feed stream.

According to one or more embodiments, a method of upgrading a hydrocarbon feed stream may comprise: separating the hydrocarbon feed stream into a heavy fraction and a light fraction, hydrotreating an aromatic feed stream with at least a first catalyst in a first reactor comprising hydrogen to produce a first product effluent, combining the heavy fraction with at least a portion of the first product effluent to form a mixed stream, and hydrotreating the mixed stream with one or more second catalysts in a second reactor comprising hydrogen to produce a second product effluent; wherein: the aromatic feed stream comprises greater than or equal to 50 wt. % aromatics, the aromatic feed stream comprises light cycle oil, coker gas oil, pyrolysis fuel oil, or combinations thereof, a liquid-hourly space velocity (LHSV) of the aromatic feed stream to the first catalyst in the first reactor is from $0.2$ $h^{-1}$ to $2.0$ $h^{-1}$, the first product effluent comprises less than 50 wt. % aromatics, and the first product effluent comprises greater than or equal to 20 wt. % naphthenes.

This summary is provided to introduce a selection of concepts that are further described in the detailed description. This summary is not intended to identify key or essential features of the claimed subject matter, nor is it intended to be used as an aid in limiting the scope of the claimed subject matter.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

DESCRIPTION OF DRAWINGS

FIG. 1 is a generalized schematic diagram of a reaction system, according to one or more embodiments described herein.

For the purpose of describing the simplified schematic illustrations and descriptions of the relevant FIGURE, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in hydrocracking units, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feed stream streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant FIGURE, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the stream signified by an arrow may be transported between the system components, such as if a slip stream is present.

It should be understood that two or more process streams are "mixed" or "combined" when two or more lines intersect in the schematic flow diagrams of the relevant FIGURE. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings.

DETAILED DESCRIPTION

Embodiments of the present disclosure are directed to methods for upgrading hydrocarbon feed streams into one or more product effluents using a system that includes a first reactor to hydrotreat an aromatic feed stream, and a second reactor to hydrotreat a mixture of the hydrotreated aromatic feedstream and a heavy fraction of a hydrocarbon feed stream, such as a heavy fraction of a crude oil.

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" or "separator" refers to any separation device or system of separation devices that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided, or separated, into two or more process streams of desired composition. Further, in some separation processes, a "lesser boiling point fraction" (sometimes referred to as a "light fraction") and a "greater boiling point fraction" (sometimes referred to as a "heavy fraction") may exit the separation unit, where, on average, the contents of the lesser boiling point fraction stream have a lesser boiling point than the greater boiling point fraction stream. Other streams may fall between the lesser boiling point fraction and the greater boiling point fraction, such as an "intermediate boiling point fraction."

It should be understood that an "effluent" generally refers to a stream that exits a system component such as a separation unit, a reactor, or reaction zone, following a particular reaction or separation, and generally has a different composition (at least proportionally) than the stream that entered the separation unit, reactor, or reaction zone.

As used in this disclosure, a "catalyst" refers to any substance that increases the rate of a specific chemical reaction. Catalysts described in this disclosure may be utilized to promote various reactions, such as, but not limited to, hydrogenation, demetalization, desulfurization, and denitrogenation. As used in this disclosure, "hydrogenation" generally refers to a chemical reaction where organic compounds are reduced or saturated. For example, an unsaturated hydrocarbon having carbon to carbon double bonds reduced to a single bond such as the conversion of an aromatic compound to a naphthene.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "first product effluent" passing from a first system component to a second system component should be understood to equivalently disclose the "first product" passing from a first system component to a second system component, and the like.

The hydrocarbon feed stream may generally comprise a hydrocarbon material. In embodiments, the hydrocarbon material of the hydrocarbon feed stream may be crude oil. As used in this disclosure, the term "crude oil" is to be understood to mean a mixture of petroleum liquids, gases, or combinations of liquids and gases, including in some embodiments impurities such as sulfur-containing compounds, nitrogen-containing compounds and metal compounds that has not undergone significant separation or reaction processes. Crude oils are distinguished from fractions of crude oil. In certain embodiments the crude oil feed stream may be a minimally treated light crude oil to provide a crude oil feed stream having total metals (Ni+V) content of less than 5 parts per million by weight (ppmw) and Conradson carbon residue of less than 5 wt %.

While the present description and examples may specify crude oil as the hydrocarbon material of the hydrocarbon feed stream, it should be understood that the methods and systems 100 described may be applicable for the conversion of a wide variety of hydrocarbon materials, which may be present in the hydrocarbon feed stream, including, but not limited to, crude oil, vacuum residue, tar sands, bitumen, atmospheric residue, vacuum gas oils, demetalized oils, naphtha streams, other hydrocarbon streams, or combinations of these materials. The hydrocarbon feed stream may include one or more non-hydrocarbon constituents, such as one or more heavy metals, sulphur compounds, nitrogen compounds, inorganic components, or other non-hydrocarbon compounds. If the hydrocarbon feed stream 102 is crude oil, it may have an American Petroleum Institute (API) gravity of from 22 degrees to 40 degrees. For example, the hydrocarbon feed stream utilized may be an Arab heavy crude oil, Arab light crude oil, or Arab extra light crude oil. Example properties for one particular exemplary grade of Arab light crude oil are provided subsequently in Table 1. It should be understood that, as used in this disclosure, a "hydrocarbon feed" may refer to a raw hydrocarbon material which has not been previously treated, separated, or otherwise refined (such as crude oil) or may refer to a hydrocarbon material which has undergone some degree of processing, such as treatment, separation, reaction, purifying, or other operation, prior to being introduced to the system 100 in the hydrocarbon feed stream.

TABLE 1

| Analysis | Units | Value |
| --- | --- | --- |
| American Petroleum Institute (API) gravity | degree | 33 |
| Density | grams per cubic centimeter (g/cm$^3$) | 0.8861 |
| Sulfur Content | weight percent (wt. %) | 1.85 |
| Nickel | parts per million by weight (ppmw) | 4 |
| Vanadium | ppmw | 14 |
| Sodium Chloride (NaCl) Content | ppmw | 2.9 |
| Conradson Carbon (CCR) | wt. % | 4.18 |
| C$_5$ Asphaltenes | wt. % | — |
| C$_7$ Asphaltenes | wt. % | 1.65 |

In general, the contents of the hydrocarbon feed stream may include a relatively wide variety of chemical species based on boiling point. For example, the hydrocarbon feed stream may have composition such that the difference between the 5 wt. % boiling point and the 95 wt. % boiling point of the hydrocarbon feed stream is at least 100° C., at least 200° C., at least 300° C., at least 400° C., at least 500° C., or even at least 600° C. In embodiments, the hydrocarbon feed stream may have a 50 wt. % boiling point of greater than or equal to 250° C., greater than or equal to 300° C., or greater than or equal to 350° C.

In embodiments, a method of upgrading a hydrocarbon feed stream may comprise, separating the hydrocarbon feed stream into a heavy fraction and a light fraction, hydrotreating an aromatic feed stream with at least a first catalyst in a first reactor comprising hydrogen to produce a first product effluent, combining the heavy fraction with at least a portion of the first product effluent to form a mixed stream, and hydrotreating the mixed stream with one or more second catalysts in a second reactor comprising hydrogen to produce a second product effluent.

Referring now to FIG. 1, an upgrading system 100 is schematically depicted. The upgrading system 100 includes a feed separator 104, a first reactor, such as a first hydrotreater 114, and a second reactor, such as a second hydrotreater 114. The separator 104 generally receives a hydrocarbon feed stream 102. The first hydrotreater 114 generally receives an aromatic feed stream 110. The second hydrotreater 120 generally receives a mixed stream 118 comprising an effluent from the separator 104 and the first hydrotreater 114.

The hydrocarbon feed stream 102 may be introduced to the feed separator 104 which may separate the contents of the hydrocarbon feed stream 102 into at least a greater boiling point fraction stream 106 and a lesser boiling point fraction stream 108. In one or more embodiments, at least 90 wt. %, at least 95 wt. %, at least 99 wt. %, or even at least 99.9 wt. % of the hydrocarbon feed stream may be present in the combination of the greater boiling point fraction stream 106 and a lesser boiling point fraction stream 108. In one or more embodiments, the feed separator 104 may include an atmospheric separation device, such as a distillation column, which may separate the contents of the hydrocarbon feed stream 102 into two or more fractions. The heaviest fraction separated in the atmospheric separation device may be referred to as the atmospheric residue. In embodiments, the atmospheric separation device operates at or near atmospheric pressure (such as, for example, from 1.2 to 1.5 atm). In embodiments, the feed separator 104 may include a vapor-liquid separator such as a flash drum (sometimes referred to as a breakpot, knock-out drum, knock-out pot, compressor suction drum, or compressor inlet drum). In embodiments that utilize a vapor-liquid separator as the feed separator 104, the lesser boiling point fraction stream 108 may exit the feed separator 104 as a vapor and the greater boiling point fraction stream 106 may exit the feed separator 104 as a liquid.

The feed separator 104 may be operated at a temperature and pressure suitable to separate the hydrocarbon feed stream 102 into the greater boiling point fraction stream 106 and the lesser boiling point fraction stream 108. The cut temperature or "cut point" (that is, the approximate atmospheric boiling point temperature separating the greater boiling point fraction stream 106 and the lesser boiling point fraction stream 108) of the vapor-liquid separator may be from 180 degrees Celsius (° C.) to 400° C. As such, all components of the lesser boiling point fraction stream may have a boiling point (at atmospheric pressure) of less than 400° C., less than 350° C., less than 300° C., less than 250° C., or less than 200° C., or even less than 180° C., and all components of the greater boiling point fraction stream may have a boiling point (at atmospheric pressure) of at least 180° C., at least 200° C., at least 250° C., at least 300° C., or at least 350° C., or even at least 400° C. In one or more embodiments, the cut point may be approximately 350° C.

The greater boiling point fraction stream 106 may contain hydrocarbons with a boiling point of greater than or equal to about 350° C. The greater boiling point fraction stream 106 can be referred to atmospheric residue. In general, atmospheric residue may contain hydrocarbons which cannot vaporize in the separator 104 because they begin to crack or otherwise break down at vaporization temperatures. In embodiments, the greater boiling point fraction stream 106 can comprise greater than or equal to 20 wt. % hydrocarbons having a boiling point of greater than 540° C., such as greater than or equal to 25 wt. %, greater than or equal to 30 wt. %, or greater than or equal to 35 wt. %, based on the total weight of the greater boiling point fraction stream 106.

In one or more embodiments, the feed separator 104 may be a flashing column that may separate the hydrocarbon feed stream 102 into the greater boiling point fraction stream 106 and the lesser boiling point fraction stream 108. The flashing column may be operated at a flashing temperature that results in the greater boiling point fraction stream 106 having less than 10 wt. % Conradson Carbon and less than 10 parts per million by weight (ppmw) total metals. In embodiments, the flashing column may be operated at a temperature of from 180° C. to 400° C. (if operated at atmospheric pressure), or other temperatures based on the pressure in the flashing column. Alternatively, in other embodiments, the feed separator 104 may include at least one of a distillation device or a cyclonic vapor liquid separation device.

One or more supplemental feed streams (not shown) may be added to the hydrocarbon feed stream 102 prior to introducing the hydrocarbon feed stream 102 to the feed separator 104. As previously described, in one or more embodiments, the hydrocarbon feed stream 102 may be crude oil. In one or more embodiments, the hydrocarbon feed stream 102 may be crude oil, and one or more supplemental feed streams comprising one or more of a vacuum residue, tar sands, bitumen, atmospheric residue, vacuum gas oils, demetalized oils, naphtha streams, other hydrocarbon streams, or combinations of these materials, may be added to the crude oil upstream of the feed separator 104.

Although some embodiments of the present disclosure focus on converting a hydrocarbon feed stream 102 that is a crude oil, the hydrocarbon feed stream 102 may alternatively comprise a plurality of refinery hydrocarbon streams outputted from one or more crude oil refinery operations. The plurality of refinery hydrocarbon streams may include a vacuum residue, an atmospheric residue, or a vacuum gas oil, for example. In some embodiments, the plurality of refinery hydrocarbon streams may be combined into the hydrocarbon feed stream 102. In these embodiments, the hydrocarbon feed stream 102 may be introduced to the feed separator 104 and separated into the greater boiling point fraction stream 106 and the lesser boiling point fraction stream 108.

The lesser boiling point fraction stream 108 can be further separated into other fractions, such as naphtha, kerosene, AGO. The lesser point fraction stream 108, or one or more fractions derived therefrom, can be further processed, such as hydrotreating, steam cracking, or reforming to produce other petrochemical products.

The aromatic feed stream 110 and hydrogen 112 may be introduced to the first hydrotreater 114. The first hydrotreater 114 can hydrotreat the aromatic feed stream 110 to form a first product effluent 116. It should be understood that, while several specific embodiments of hydroprocessing catalysts are disclosed herein, the hydroprocessing catalysts and conditions are not necessarily limited in the embodiments presently described.

In embodiments, the aromatic feed stream 110 can comprise greater than or equal to 50 weight percent (wt. %) aromatics, such as greater than or equal to 55 wt. %, greater than or equal to 60 wt. %, greater than or equal to 65 wt. %, greater than or equal to 70 wt. %, or greater than or equal to 75 wt. % aromatics based on the total weight of the aromatic feed stream 110. In embodiments, the aromatic feed stream 110 can comprise of from 50 wt. % to 100 wt. % aromatics, such as from 50 wt. % to 95 wt. %, from 50 wt. % to 90 wt. %, from 50 wt. % to 85 wt. %, from 50 wt. % to 80 wt. %, from 55 wt. % to 95 wt. %, from 55 wt. % to 90 wt. %, from 55 wt. % to 85 wt. %, from 55 wt. % to 80 wt. %, from 60 wt. % to 95 wt. %, from 60 wt. % to 90 wt. %, from 60 wt. % to 85 wt. %, from 60 wt. % to 80 wt. %, from 65 wt. % to 95 wt. %, from 65 wt. % to 90 wt. %, from 65 wt. % to 85 wt. %, from 65 wt. % to 80 wt. %, from 70 wt. % to 95 wt. %, from 70 wt. % to 90 wt. %, from 70 wt. % to 85 wt. %, from 70 wt. % to 80 wt. %, or from 75 wt. % to 80 wt. % aromatics based on the total weight of the aromatic feed stream 110.

In embodiments, the aromatic feed stream 110 can comprise less than or equal to 20 wt. % naphthenes, such as less than or equal to 15 wt. %, or less than or equal to 10 wt. % naphthenes, based on the total weight of the aromatic feed stream 110. In embodiments, the aromatic feed stream 110 can comprise of from 0 wt. % to 20 wt. % naphthenes, such as from 5 wt. % to 20 wt. %, or from 5 wt. % to 15 wt. % naphthenes.

In embodiments, the aromatic feed stream 110 can comprise light cycle oil, coker gas oil, pyrolysis fuel oil, or combinations thereof. As used herein, "light cycle oil" refers to a diesel boiling range product from a fluid catalytic cracking unit. As used herein, "coker gas oil" refers to the hydrocarbons produced from a coker, and the boiling range is in 180-540° C. As used herein, "pyrolysis fuel oil" refers to oil products from thermal cracking (boiling range 180-540° C.) biomass. In embodiments, the aromatic feed stream can be selected from the group consisting of light cycle oil, coker gas oil, pyrolysis fuel oil, or combinations thereof.

Hydrotreating the aromatic feed stream 110 may occur under conditions that increase saturations of the aromatic species in the aromatic feed stream 110, such that species like aromatics are converted to naphthenes. The first product effluent 116 having a greater concentration of naphthenes may have a greater propensity for donating hydrogen in further hydrotreating reactions compared to the untreated aromatic feed stream 110. A representative mechanism of the production of hydrogen from naphthenes is depicted below:

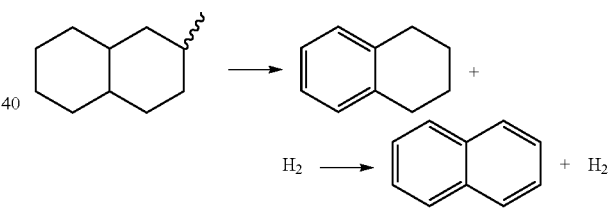

In embodiments, the first product effluent 116 can be referred to as a hydrogen donor solvent. As used herein, a "hydrogen donor solvent" refers to a mixture comprising one or more materials operable to donate hydrogen molecules during a chemical reaction, such as a hydrotreating reaction. In embodiments, the hydrogen donor solvent comprises naphthenes.

In embodiments, the first hydrotreater 114 can comprise at least a first catalyst. As used herein, "first catalyst" refers to the one or more catalysts present in the first hydrotreater 114. In embodiments, the first catalyst can comprise nickel, molybdenum, cobalt, alumina, or combinations of two or more thereof. For instance, in embodiments the first catalyst can comprise nickel and molybdenum disposed on a support material, such as alumina. In embodiments, the first catalyst can comprise nickel and molybdenum disposed on alumina, cobalt and molybdenum disposed on alumina, nickel, cobalt, and molybdenum disposed on alumina, or combinations of two or more thereof. In embodiments, the first catalyst can be selected from the group consisting of can comprise nickel and molybdenum disposed on alumina, cobalt and molybdenum disposed on alumina, nickel, cobalt, and molybdenum disposed on alumina, or combinations of two or more thereof. In embodiments, the first hydrotreater 114 can comprise two or more catalysts. In embodiments, the two or more catalysts can comprise nickel, molybdenum, cobalt, alumina, or combinations of two or more thereof. In embodiments, the two or more catalysts can comprise nickel and molybdenum disposed on alumina, cobalt and molybdenum disposed on alumina, nickel, cobalt, and molybdenum disposed on alumina, or combinations of two or more thereof. In embodiments, the two or more catalysts can be selected from the group consisting of nickel and molybdenum disposed on alumina, cobalt and molybdenum disposed on alumina, nickel, cobalt, and molybdenum disposed on alumina, or combinations of two or more thereof.

In embodiments, a reaction temperature of the first hydrotreater 114 during the hydrotreating can be of from 300° C. to 400° C., such as from 300° C. to 380° C., from 300° C. to 370° C., from 310° C. to 390° C., from 310° C. to 380° C., from 310° C. to 370° C., from 320° C. to 390° C., from 320° C. to 380° C., from 320° C. to 370° C., from 330° C. to 390° C., from 330° C. to 380° C., from 330° C. to 370° C., from 340° C. to 390° C., from 340° C. to 380° C., from 340° C. to 370° C., from 350° C. to 390° C., from 350° C. to 380° C., or from 350° C. to 370° C. Without intending to be bound by any particular theory, it is believed that a lower reaction temperature, such as less than 300° C., the reaction may be driven by kinetics control, leading to low conversion of the aromatic feed stream to first product effluent. It is believed that a reaction temperature greater than 400° C., the reaction may be driven by thermodynamic control, leading to increased dehydrogenation, which may cause saturated molecules to be converted back to aromatics. The increased dehydrogenation may lead to low conversion and increased coke formation.

In embodiments, a liquid hour space velocity (LHSV) of the aromatic feed stream 110 to the first catalyst in the first hydrotreater 114 during hydrotreating can be from 0.2 h$^{-1}$ to 2.0 h$^{-1}$. As used herein, the LHSV of the aromatic feed stream to the first catalyst refers to a ratio of liquid volume flow of the aromatic feed stream 110 in the first hydrotreater 114 per hour to a volume of the first catalyst in the first hydrotreater 114. In embodiments where the first hydrotreater 114 comprises more than one first catalyst, the LHSV refers to the total catalyst volume in the first hydrotreater 114. In embodiments, the LHSV of the aromatic feedstream 110 to the first catalyst in the first hydrotreater 114 can be from 0.2 h$^{-1}$ to 2.0 h$^{-1}$, from 0.3 h$^{-1}$ to 2.0 h$^{-1}$ from 0.4 to 2.0 h$^{-1}$, from 0.5 to 2.0 h$^{-1}$, from 0.2 to 1.5 h$^{-1}$, from 0.3 to 1.5 h$^{-1}$, from 0.4 to 1.5 h$^{-1}$, from 0.5 to 1.5 h$^{-1}$, from 0.2 to 1.0 h$^{-1}$, from 0.3 to 1.0 h$^{-1}$, from 0.4 h$^{-1}$ to 1.0 h$^{-1}$, from 0.5 h$^{-1}$ to 1.0 h$^{-1}$, from 0.2 h$^{-1}$ to 0.9 h$^{-1}$, from 0.3 h$^{-1}$ to 0.9 h$^{-1}$, from 0.4 h$^{-1}$ to 0.9 h$^{-1}$ from 0.5 to 0.9 h$^{-1}$, from 0.2 to 0.8 h$^{-1}$, from 0.3 to 0.8 h$^{-1}$, from 0.4 to 0.8 h$^{-1}$, or from 0.5 to 0.8 h$^{-1}$. Without intending to be bound by any particular theory, it is believed that a lower LHSV of the aromatic feed stream 110 to the first catalyst in the first hydrotreater 114, such as less than 0.2 h$^{-1}$, may reduce the efficient contact of the aromatic feed stream 110 and the catalyst, reducing formation of the first product effluent. It is believed that a higher LHSV of the aromatic feed stream 110 to the first catalyst in the first hydrotreater 114, such as greater than 2.0 h$^{-1}$, may lead to short contact time and lower conversion.

In embodiments, a pressure in the first hydrotreater 114 during hydrotreating can be of from 60 bars to 150 bars, such as from 60 bars to 140 bars, from 60 bars to 130 bars, from 60 bars to 120 bars, from 60 bars to 110 bars, from 60 bars to 100 bars, from 70 bars to 150 bars, from 70 bars to 140 bars, from 70 bars to 130 bars, from 70 bars to 120 bars, from 70 bars to 110 bars, from 70 bars to 100 bars, from 80 bars to 150 bars, from 80 bars to 140 bars, from 80 bars to 130 bars, from 80 bars to 120 bars, from 80 bars to 110 bars, or from 80 bars to 100 bars. Without intending to be bound by any particular theory, it is believed a lower pressure in the first hydrotreater 114 during hydrotreating, such as less than 60 bars may lead to low aromatics saturation. It is believed a higher pressure in the first hydrotreater 114 during hydrotreating, such as greater than 150 bars may require increased operational costs in the form of upgraded materials, such as reactor vessels, pipes, heat exchanger, to withstand higher pressures during operation.

In embodiments, a weight ratio of hydrogen to the aromatic feed stream 110 in the first hydrotreater 114 ($H_2$:oil ratio) during hydrotreating can be of from 500 to 1200, such as from 500 to 1100, from 500 to 1000, from 500 to 900, from 500 to 800, from 600 to 1200, from 600 to 1100, from 600 to 1000, from 600 to 900, from 600 to 800, from 650 to 1200, from 650 to 1100, from 650 to 1000, from 650 to 900, or from 650 to 800. Without intending to be bound by any particular theory, it is believed that a smaller $H_2$:oil ratio in the first hydrotreater 114 during hydrotreating may make cause the hydrogen consumption to be lower than the supplied hydrogen, which may decrease the hydrogenation of aromatics. Additionally, low hydrogen supply may reduce the driving force for hydrogen to diffuse to the catalyst surface, reducing the formation of the first product effluent. It is believed that a larger $H_2$:oil ratio in the first hydrotreater 114 during hydrotreating may reduce hydrocarbon partial pressure and increase the make-up and recycle hydrogen compressor workload, and thus increase investment and operation cost.

In embodiments, the first product effluent 116 comprises a product stream from the first hydrotreater 114. In embodiments, the first product effluent can comprise less than 50 wt. % aromatics, such as less than 45 wt. %, less than 40 wt. %, less than 35 wt. %, less than 30 wt. %, less than 25 wt. %, or less than 20 wt. % aromatics based on the total weight of the first product effluent 116. In embodiments, the first product effluent 116 comprises of from 0 wt. % to 50 wt. % aromatics, such as from 0 wt. % to 45 wt. %, from 0 wt. % to 40 wt. %, from 0 wt. % to 35 wt. %, from 0 wt. % to 30 wt. %, from 0 wt. % to 25 wt. %, or from 0 wt. Without intending to be bound by any particular theory, it is believed that a reduced amount of aromatics in the first product effluent 116, such as less than 50 wt. % aromatics can increase a hydrogen donation ability of the first product effluent 116 when mixed with a heavy fraction of a crude oil in a hydrotreater, which may improve upgrading of the heavy fraction of crude oil during hydrotreating.

In embodiments, the first product effluent 116 can comprise greater than or equal to 20 wt. % naphthenes, such as greater than or equal to 25 wt. %, greater than or equal to 30 wt. %, greater than or equal to 35 wt. %, or greater than or equal to 40 wt. % naphthenes, based on the total weight of the first product effluent 116. In embodiments, the first product effluent 116 can comprise of from 20 wt. % to 80 wt. % naphthenes, such as from 25 wt. % to 80 wt. %, from 30 wt. % to 80 wt. %, from 35 wt. % to 80 wt. %, from 40 wt. % to 80 wt. %, from 20 wt. % to 70 wt. %, from 25 wt. % to 70 wt. %, from 30 wt. % to 70 wt. %, from 35 wt. % to 70 wt. %, from 40 wt. % to 70 wt. %, from 20 wt. % to 60 wt. %, from 25 wt. % to 60 wt. %, from 30 wt. % to 60 wt. %, from 35 wt. % to 60 wt. %, from 40 wt. % to 60 wt. %, from 20 wt. % to 50 wt. %, from 25 wt. % to 50 wt. %, from 30 wt. % to 50 wt. %, from 35 wt. % to 50 wt. %, from 40 wt. % to 50 wt. %, or from 40 wt. % to 45 wt. % naphthenes. Without intending to be bound by any particular theory, it is believed that an increased amount of naphthenes in the first product effluent 116, such as greater than or equal to 20 wt. %, greater than or equal to 30 wt. %, or greater than or equal to 40 wt. % naphthenes can increase a hydrogen donation ability of the first product effluent 116 when mixed with a heavy fraction of a crude oil in a hydrotreater, which may improve upgrading of the heavy fraction of crude oil during hydrotreating.

In embodiments, the first product effluent 116 can be mixed with the greater boiling point fraction stream 106 to form the mixed stream 118.

In embodiments, the first product effluent 116 and the greater boiling fraction stream 106 can be mixed at a weight ratio of from 100:1 to 1:1, such as from 90:1 to 1:1, from 80:1 to 1:1, from 70:1 to 1:1, from 60:1 to 1:1, from 50:1 to 1:1, from 40:1 to 1:1, from 30:1 to 20:1, from 10:1 to 1:1, or from 5:1 to 1:1 to form the mixed stream 118.

In embodiments, the mixed stream 118 can comprise of from 1 wt. % to 50 wt. % of the first product effluent 116, based on the total weight mixed stream 118. For instance, the mixed stream 118 can comprise of from 1 wt. % to 40 wt. %, from 1 wt. % to 30 wt. %, from 1 wt. % to 20 wt. %, from 1 wt. % to 10 wt. %, from 1 wt. % to 5 wt. %, from 5 wt. % to 50 wt. %, from 5 wt. % to 40 wt. %, from 5 wt. % to 30 wt. %, from 5 wt. % to 20 wt. %, from 5 wt. % to 10 wt. %, from 10 wt. % to 50 wt. %, from 10 wt. % to 40 wt. %, from 10 wt. % to 30 wt. %, from 10 wt. % to 20 wt. %, from 20 wt. % to 50 wt. %, from 20 wt. % to 40 wt. %, from 20 wt. % to 30 wt. %, from 30 wt. % to 50 wt. %, from 30 wt. % to 40 wt. %, or from 40 wt. % to 50 wt. % of the first product effluent 116, based on the total weight of the mixed stream 118.

In embodiments, the mixed stream 118 can comprise of from 50 wt. % to 99 wt. % of the greater boiling point fraction stream 106, based on the total weight of the mixed stream 118. For instance, the mixed stream 118 can comprise of from 50 wt. %, to 90 wt. %, from 50 wt. %, to 80 wt. %, from 50 wt. %, to 70 wt. %, from 50 wt. %, to 60 wt. %, from 60 wt. %, to 99 wt. %, from 60 wt. %, to 90 wt. %, from 60 wt. %, to 80 wt. %, from 60 wt. %, to 70 wt. %, from 70 wt. %, to 99 wt. %, from 70 wt. %, to 90 wt. %, from 70 wt. %, to 80 wt. %, from 80 wt. %, to 99 wt. %, from 80 wt. %, to 90 wt. %, or from 90 wt. %, to 99 wt. % of the greater point fraction stream 106, based on the total weight of the mixed stream 118.

In embodiments, the first product effluent 116 and the greater boiling fraction stream 106 are mixed to form the mixed stream 118 and the mixed stream 118 can be added to the second hydrotreater 120. In other embodiments, the first product effluent 116 and the greater boiling fraction stream 106 are added separately to the second hydrotreater 120 to form the mixed stream 118.

The mixed stream 118 and hydrogen 122 may be introduced to the second hydrotreater 120. The second hydrotreater 120 can hydrotreat the mixed stream 118 to form a second product effluent 124. It should be understood that, while several specific embodiments of hydroprocessing catalysts are disclosed herein, the hydroprocessing catalysts and conditions are not necessarily limited in the embodiments presently described.

In embodiments, the mixed stream 118 can comprise greater than or equal to 20 wt. %, greater than or equal to 25 wt. %, greater than or equal to 30 wt. %, greater than or equal to 35 wt. %, greater than or equal to 40 wt. %, or even greater than or equal to 45 wt. % naphthenes, based on the total weight of the mixed stream 118. In embodiments, the mixed stream 118 can comprise of from 30 wt. % to 45 wt. % naphthenes.

In embodiments, the mixed stream 118 can comprise less than or equal to 30 wt. % aromatics, such as less than or equal to 25 wt. %, less than or equal to 20 wt. %, or less than or equal to 15 wt. % aromatics. In embodiments, the mixed stream 118 can comprise of from 10 wt. % to 30 wt. % aromatics.

Hydrotreating the mixed stream 118 may occur under conditions that reduce an amount of sulfur, nitrogen, nickel, vanadium, or combinations thereof while reducing coke formation and subsequent catalyst deactivation. Without intending to be bound by any particular theory, it is believed that the first product effluent 116 can donate hydrogen during the hydrotreating of the greater boiling point stream 106, which may reduce an amount of catalytic cracking that occurs, which may reduce the formation of coke. Further, it is believed that the reduction of coke formation may increase a lifetime of catalysts used in the system compared to systems that do not utilize a first product effluent 116 of a hydrotreated aromatic feed stream 110. Further, it is believed that the first product effluent 116 may closely contact the catalyst surface produce hydrogen that can react with heavy oil molecules.

The mixed stream 118 may be treated with one or more second catalysts. As used herein, "second catalysts" refer to catalysts present in the second hydrotreater 120. In embodiments, the one or more second catalysts can comprise nickel, molybdenum, cobalt, alumina, or combinations of two or more thereof. In embodiments, the one or more second catalysts can comprise a hydrodemetalization catalyst (referred to sometimes in this disclosure as an "HDM catalyst"), a transition catalyst, a hydrodenitrogenation catalyst (referred to sometimes in this disclosure as an "HDN catalyst"), a hydrodesulfurization catalyst (referred to sometimes in this disclosure as an "HDS catalyst"), or a combination of two or more thereof in the second hydrotreater 120. In embodiments where the second hydrotreater 120 comprises two or more second catalysts, the two or more second catalysts may be positioned in series, either contained in a single reactor, such as a packed bed reactor with multiple beds, or contained in two or more reactors arranged in series.

In embodiments, a reaction temperature of the second hydrotreater 120 during the hydrotreating can be of from 350° C. to 430° C., such as from 370° C. to 415° C. Without intending to be bound by any particular theory, it is believed that a lower reaction temperature, such as less than 350° C. may have very low conversion of the mixed stream to form the second product effluent. It is believed that at a reaction temperature greater than 430° C., the reaction may be driven by thermodynamic control, leading to increased dehydrogenation, which may cause saturated molecules to be converted back to aromatics. The increased dehydrogenation may lead to low conversion and increased coke formation.

In embodiments, a liquid hour space velocity (LHSV) of the mixed stream 118 to the second catalyst(s) in the second hydrotreater 120 during hydrotreating can be from 0.1 $h^{-1}$ to 1.0 $h^{-1}$. As used herein, the LHSV of the mixed stream 118 to the second catalyst(s) refers to a ratio of liquid volume flow of the mixed stream 118 in the second hydrotreater 120 per hour to a volume of the second catalyst(s) in the second hydrotreater 120. In embodiments where the second hydrotreater 120 comprises more than one second catalyst, the LHSV refers to the total catalyst volume in the second hydrotreater 120. In embodiments, the LHSV of the mixed stream 118 to the second catalyst(s) in the second hydrotreater 120 can be from 0.1 h$^{-1}$ to 0.9 h$^{-1}$, from 0.1 h$^{-1}$ to 0.9 h$^{-1}$, from 0.1 h$^{-1}$ to 0.8 h$^{-1}$, from 0.1 to 0.7 h$^{-1}$, from 0.1 to 0.6 h$^{-1}$, from 0.1 to 0.5 h$^{-1}$, from 0.1 h$^{-1}$ to 0.4 h$^{-1}$, from 0.1 h$^{-1}$ to 0.3 h$^{-1}$, from 0.1 h$^{-1}$ to 0.2 h$^{-1}$, from 0.15 h$^{-1}$ to 0.9 h$^{-1}$, from 0.15 to 0.9 h$^{-1}$, from 0.15 to 0.8 h$^{-1}$, from 0.15 to 0.7 h$^{-1}$, from 0.15 h$^{-1}$ to 0.6 h$^{-1}$, from 0.15 h$^{-1}$ to 0.5 h$^{-1}$, from 0.15 h$^{-1}$ to 0.4 h$^{-1}$, from 0.15 h$^{-1}$ to 0.3 h$^{-1}$, from 0.2 h$^{-1}$ to 0.9 h$^{-1}$, from 0.2 h$^{-1}$ to 0.9 h$^{-1}$, from 0.2 h$^{-1}$ to 0.8 h$^{-1}$, from 0.2 h$^{-1}$ to 0.7 h$^{-1}$, from 0.2 h$^{-1}$ to 0.6 h$^{-1}$, from 0.2 h$^{-1}$ to 0.5 h$^{-1}$, from 0.2 h$^{-1}$ to 0.4 h$^{-1}$, or from 0.2 h$^{-1}$ to 0.3 h$^{-1}$.

In embodiments, a pressure in the second hydrotreater 120 during hydrotreating can be of from 60 bars to 200 bars, such as from 60 bars to 190 bars, from 60 bars to 180 bars, from 60 bars to 170 bars, from 60 bars to 160 bars, from 60 bars to 150 bars, from 70 bars to 200 bars, from 70 bars to 190 bars, from 70 bars to 180 bars, from 70 bars to 170 bars, from 70 bars to 160 bars, from 70 bars to 150 bars, from 80 bars to 200 bars, from 80 bars to 190 bars, 80 bars to 180 bars, from 80 bars to 170 bars, from 80 bars to 160 bars, from 80 bars to 150 bars, or from 90 bars to 150 bars.

In embodiments, a weight ratio of hydrogen to the mixed stream 118 in the second hydrotreater 120 (H$_2$:oil ratio) during hydrotreating can be of from 500 to 1500, such as from 500 to 1400, from 500 to 1300, from 500 to 1200, from 500 to 1100, from 500 to 1000, from 500 to 900, from 500 to 800, from 800 to 1500, from 800 to 1400, from 800 to 1300, from 800 to 1200, from 800 to 1100, from 800 to 1000, from 800 to 900, from 1000 to 1500, from 1000 to 1400, from 1000 to 1300, or from 1000 to 1200.

In embodiments, the second product effluent 124 can comprise greater than or equal to 40 wt. % hydrocarbons having a boiling point of from 350° C. to 540° C. For example, in embodiments, the second product effluent 124 can comprise greater than or equal to 45 wt. %, greater than or equal to 50 wt. %, or greater than or equal to 55 wt. % hydrocarbons having a boiling point of from 350° C. to 540° C.

In embodiments, the second product effluent 124 can comprise less than 25 wt. % hydrocarbons having a boiling point of greater than 540° C. For example, in embodiments, the second product effluent 124 can comprise less than 20 wt. %, less than 15 wt. %, or less than 10 wt. % hydrocarbons having a boiling point of greater than 540° C.

In embodiments, the hydrotreating in the second hydrotreater 120 can result in a hydrodesulfurization rate (HDS %) greater than or equal to 70%, such as greater than or equal to 75%, greater than or equal to 80%, or greater than or equal to 85%. As used herein, the HDS % is calculated according to equation 1:

$$\text{HDS \%} = (\text{sulfur content in feed} - \text{sulfur content in liquid product})/\text{sulfur content in feed} * 100 \quad \text{(equation 1)}$$

In embodiments, the hydrotreating in the second hydrotreater 120 can result in a hydrodenitrogenation rate (HDN %) of greater than or equal to 25%, such as greater than or equal to 30%, greater than or equal to 35%, or greater than or equal to 40%. As used herein, the HDN % is calculated according to equation 2:

$$\text{HDS \%} = (\text{nitrogen content in feed} - \text{nitrogen content in liquid product})/\text{nitrogen content in feed} * 100 \quad \text{(equation 2)}$$

In embodiments, the hydrotreating in the second hydrotreater 120 can result in a hydrodemetalization rate (HDM %) of greater than or equal to 70%, such as greater than or equal to 75%, greater than or equal to 80%, greater than or equal to 85%, greater than or equal to 90%, or greater than or equal to 95%. As used herein, the HDM % is calculated according to equation 3:

$$\text{HDM \%} = (\text{Nickel and vanadium content in feed} - \text{Nickel and vanadium content in liquid product})/\text{Nickel and vanadium content in feed} * 100 \quad \text{(equation 3)}$$

According to an aspect, either alone or in combination with any other aspect, a method of upgrading a hydrocarbon feed stream comprises: separating the hydrocarbon feed stream into a heavy fraction and a light fraction, hydrotreating an aromatic feed stream with at least a first catalyst in a first reactor comprising hydrogen to produce a first product effluent, combining the heavy fraction with at least a portion of the first product effluent to form a mixed stream, and hydrotreating the mixed stream with one or more second catalysts in a second reactor comprising hydrogen to produce a second product effluent; wherein: the aromatic feed stream comprises greater than or equal to 50 wt. % aromatics, the aromatic feed stream comprises light cycle oil, coker gas oil, pyrolysis fuel oil, or combinations thereof, a liquid-hourly space velocity (LHSV) of the aromatic feed stream to the first catalyst in the first reactor is from 0.2 h$^{-1}$ to 2.0 h$^{-1}$, the first product effluent comprises less than 50 wt. % aromatics, and the first product effluent comprises greater than or equal to 20 wt. % naphthenes.

According to a second aspect, either alone or in combination with any other aspect, wherein the hydrocarbon feed stream comprises a crude oil.

According to a third aspect, either alone or in combination with any other aspect, wherein the hydrocarbon feed stream has a 50 wt. % boiling point of greater than or equal to 250° C.

According to a fourth aspect, either alone or in combination with any other aspect, wherein the heavy fraction comprises greater than or equal to 20 wt. % hydrocarbons having a boiling point of greater than 540° C.

According to a fifth aspect, either alone or in combination with any other aspect, wherein the heavy fraction has a boiling point of greater than or equal to 350° C.

According to a sixth aspect, either alone or in combination with any other aspect, wherein the aromatic feed stream comprises less than 20 wt. % naphthenes.

According to a seventh aspect, either alone or in combination with any other aspect, wherein the at least first catalyst in the first reactor comprises nickel, molybdenum, cobalt, alumina or combinations of two or more thereof.

According to an eighth aspect, either alone or in combination with any other aspect, wherein the LHSV is less than 1.0 h$^{-1}$.

According to a ninth aspect, either alone or in combination with any other aspect, wherein a weight ratio of the hydrogen to the aromatic feed stream in the first reactor is from 500:1 to 1200:1.

According to a tenth aspect, either alone or in combination with any other aspect, wherein a pressure of the hydrogen in the first reactor during the contacting is of from 60 bar to 150 bar.

According to an eleventh aspect, either alone or in combination with any other aspect, wherein a temperature of the first reactor during the hydrotreating is from 300° C. to 390° C.

According to a twelfth aspect, either alone or in combination with any other aspect, wherein the mixed stream comprises greater than or equal to 20 wt. % naphthenes.

According to a thirteenth aspect, either alone or in combination with any other aspect, wherein a temperature of the second reactor during the hydrotreating is from 350° C. to 430° C.

According to a fourteenth aspect, either alone or in combination with any other aspect, wherein a liquid-hourly space velocity (LHSV) of the mixed stream to the one or more second catalysts in the second reactor is from 0.1 h$^{-1}$ to 1.0 h$^{-1}$.

According to a fifteenth aspect, either alone or in combination with any other aspect, wherein the second product effluent comprises greater than or equal to 40 wt. % hydrocarbons having a boiling point of from 350° C. to 540° C.

According to a sixteenth aspect, either alone or in combination with any other aspect, wherein the second product effluent comprises less than 25 wt. % hydrocarbons having a boiling point of greater than 540° C.

According to a seventeenth aspect, either alone or in combination with any other aspect, wherein the hydrotreating in the second reactor results in a hydrodesulfurization rate of greater than or equal to 70%.

According to an eighteenth aspect, either alone or in combination with any other aspect, wherein the hydrotreating in the second reactor results in a hydrodenitrogenation rate of greater than or equal to 20%.

According to a nineteenth aspect, either alone or in combination with any other aspect, wherein the light fraction has a boiling point of less than 350° C.

According to a twentieth aspect, either alone or in combination with any other aspect, wherein the LHSV is less than 1.0 h$^{-1}$, a weight ratio of the hydrogen to the aromatic feed stream in the first reactor is from 650:1 to 1200:1, a pressure of the hydrogen in the first reactor during the hydrotreating is from 60 bar to 150 bar, a temperature of the first reactor during the hydrotreating is from 300° C. to 390° C., and the aromatic feed stream comprises light cycle oil.

EXAMPLES

The various embodiments disclosed herein will be further clarified by the following examples. The examples are illustrative in nature, and should not be understood to limit the embodiments disclosed herein.

Example 1. Hydrotreating Light Cycle Oil

In Example 1, light cycle oil was hydrotreated to form a hydrogen donor solvent.

Example 1-1

Light cycle oil (LCO) was used as a feed stream and hydrotreated in a fixed bed reactor with a NiMo catalyst supported on alumina to produce a hydrogen donor solvent. The fixed bed reactor operated for 15 days at a temperature of 380° C., a pressure of 100 bar, a liquid hourly space velocity (LHSV) of 0.3 h$^{-1}$ and H$_2$/oil volume ratio of 1000:1. The produced hydrogen donor solvent is denoted Example 1-1.

Example 1-2

Example 1-2 was carried out according to Example 1-1, but the fixed bed reactor was operated at a pressure of 150 bar. The produced hydrogen donor solvent is denoted Example 1-2.

Table 2 provides details regarding the properties of the LCO feed stream before hydrotreatment and the hydrogen donor solvent products Example 1-1 and Example 1-2.

TABLE 2

| | LCO | Hydrogen Donor Solvent | |
|---|---|---|---|
| | feed stream | Example 1-1 | Example 1-2 |
| Boiling range, ° C. | 130-375 | 130-375 | 130-375 |
| Density | 0.9591 | 0.8936 | 0.8636 |
| S, ppm | 13000 | 124 | 87.4 |
| N, ppm | 495.6 | 128.5 | 45 |
| Hydrocarbon type | | | |
| Paraffins, wt. % | 12.4 | 20.4 | 24.5 |
| Naphthenes, wt. % | 8.3 | 41.5 | 47.7 |
| Aromatics. Wt. % | 79.3 | 38.1 | 27.8 |

As shown in Table 2, hydrotreatment of the LCO reduced the amount of aromatics from 79.3 wt. % in the LCO feed stream to 38.1 wt. % and 27.8 wt. % in the hydrotreated LCO of Example 1-1, and Example 1-2, respectively. The amount of naphthenes increased from 8.3 wt. % to greater than 40 wt. % in Example 1-1 (41.5 wt. %) and Example 1-2 (47.7%).

Example 2. Hydrotreating Heavy Fraction of Light Crude Oil with Hydrotreated LCO In a separator, Arabic light (AL) crude oil, having properties according to Table 3, was distilled to produce a lighter fraction with a boiling point less than 350° C. and an atmospheric residue (AR) heavy fraction with a boiling point greater than or equal to 350° C. Properties of the heavy fraction are shown in Table 4. The heavy fraction was mixed with the hydrotreated LCO from Example 1-2 at a heavy fraction to hydrotreated LCO weight ratio of 80:20 to form a mixed stream and the mixed stream was added to a second reactor. The mixed stream was reacted with a catalyst system comprising NiMo supported on alumina, HDM catalyst (commercially available as KFR-22 from Albemarle), transition catalyst (commercially available as KFR-33 from Albemarle), and HDS/HDN catalyst (commercially available as KFR-70 from Albemarle) in the second reactor. The second reactor operated at a temperature of 390° C., a pressure of 150 bar, a LHSV=0.2 h$^{-1}$, and a H$_2$/oil volume ratio of 1200:1.

TABLE 3

| Property | Value |
|---|---|
| Density | 0.8595 |
| API | 33.13 |
| S, wppm | 19400 |
| N, ppm | 849 |
| Asphaltenes, wt % | 1.2 |
| Micro carbon residue, wt % | 3.4 |
| V, ppm | 15 |
| Ni, ppm | 12 |
| SimDis, ° C. | |
| IBP/5% | 33/92 |
| 10%/20% | 133/192 |
| 30%/40% | 251/310 |
| 50%/60% | 369/432 |
| 70%/80% | 503/592 |
| 90%/95% | >720/>720 |
| EBP | >720 |

TABLE 4

| | |
|---|---|
| Density | 0.9636 |
| S, wt% | 3.13 |
| N, wt% | 1698 |
| Ni, wppm | 11.4 |
| V, wppm | 23.9 |
| Yield | |
| Gas | 0 |
| C5-349° C. | 0 |
| 350-540° C. | 60.1 |
| >540° C. | 39.9 |

Comparative Example A. Hydrotreating AL Crude Oil

Comparative Example A was carried out according to Example 2, but did not include the LCO feed stream. Further, the crude oil was not distilled to form the AR heavy fraction. Specifically, the AL crude oil was processed in the second reactor without the addition of the LCO or hydrotreated LCO and processed under the conditions described in Example 2.

Comparative Example B. Hydrotreating Heavy Fraction of AL Crude Oil

Comparative Example B was carried out according to Example 2, but did not include the LCO feed stream. Specifically, the AR heavy fraction was added to the second reactor without the addition of the LCO or hydrotreated LCO and processed under the conditions described in Example 2.

Comparative Example C. Hydrotreating Heavy Fraction of AL Crude Oil with LCO

Comparative Example C was carried out according to Example 2, but the LCO feed stream was not hydrotreated prior to being added to the second reactor. Specifically, the AR heavy fraction and untreated LCO feed stream were added to the second reactor and processed under the conditions described in Example 2.

Comparative Example D. Hydrotreating AL Crude Oil with Hydrotreated LCO as Hydrogen Donor Comparative Example D was carried out according to Example 2, but the AL crude oil was not distilled to form the AR heavy fraction. Specifically, the AL crude oil and the hydrotreated LCO were added to the second reactor and processed under the conditions described in Example 2.

Example 3: Analysis of Hydrotreating Examples

Table 5 includes a summary of the differences between Example 2 and Comparative Examples A-D and a comparison of hydroprocessing performance. A rate of hydrodesulfurization (HDS %), hydrodenitrogenation (HDN %), and hydrodemetalization (HDM %) were calculated for Example 2, and Comparative Examples A-D, according to equations 1, 2, and 3, as described in this disclosure. The product yields of the hydrocarbon groups gas, C5 to boiling point of 349° C., boiling point of 350° C. to 540° C., and greater than 540° C. are reported in Table 4.

As shown in Table 5, compared with the AL and AR feed without hydrotreated LCO (Comparative Example A, and Comparative Example B), the product stream of Example 2 had a high rate of hydrodesulphurization (HDS), hydrodenitrogenation (HDN) and hydrodemetallization (HDM). The addition of the hydrotreated LCO greatly increased the HDS %, HDN %, and HDM % relative to the comparative examples that did not include the hydrotreated LCO. Further, Example 2 exhibited a higher rate of HDS, HDN, and HDM relative to Comparative Example C, which used untreated LCO in the reaction. These results demonstrate that hydrotreating the LCO stream to increase a concentration of naphthenes in the stream yields a better hydrogen donor solvent than untreated LCO. Further, Example 2 exhibited an increased yield of products having a boiling point of >540° C. relative to Comparative Examples A-D. Example 2 also exhibited an increased yield of products having a boiling point of <349° C. relative to the Comparative Examples A-C.

TABLE 5

| Feed | Comparative Example A | Comparative Example B | Comparative Example C | Comparative Example D | Example 2 |
|---|---|---|---|---|---|
| Feed stream oil | AL crude oil | AR heavy fraction | AR heavy fraction | AL crude oil | AR heavy fraction |
| LCO or Hydrotreated LCO | — | — | LCO | Hydrotreated LCO | Hydrotreated LCO |
| HDS % | 50 | 52 | 75 | 90 | 88 |
| HDN % | 10 | 7 | 28 | 52 | 41 |
| HDM (Ni + V) % | 81 | 75 | 93 | 99 | 98 |
| Product yields, wt. % | | | | | |
| Gas | 4.2 | 3.9 | 6.2 | 9.3 | 7.5 |
| C5-349° C. | 63.0 | 17.3 | 23.9 | 70.5 | 28.4 |
| 350-540° C. | 27.4 | 54.5 | 53.7 | 22.4 | 58.8 |
| >540° C. | 7.2 | 26.3 | 18.3 | 3.0 | 8.3 |

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method of upgrading a hydrocarbon feed stream, the method comprising:
    separating the hydrocarbon feed stream into a heavy fraction and a light fraction;
    hydrotreating an aromatic feed stream with at least a first catalyst in a first reactor comprising hydrogen to produce a first product effluent;
    combining the heavy fraction with at least a portion of the first product effluent to form a mixed stream; and
    hydrotreating the mixed stream with one or more second catalysts in a second reactor comprising hydrogen to produce a second product effluent;
    wherein:
        the aromatic feed stream comprises greater than or equal to 50 wt. % aromatics;
        the aromatic feed stream comprises an oil selected from the group consisting of light cycle oil, coker gas oil, pyrolysis fuel oil, and combinations thereof;
        a liquid-hourly space velocity (LHSV) of the aromatic feed stream to the first catalyst in the first reactor is from 0.2 $h^{-1}$ to 2.0 $h^{-1}$;
        the first product effluent comprises less than 50 wt. % aromatics; and
        the first product effluent comprises greater than or equal to 20 wt. % naphthenes.

2. The method of claim 1, wherein the hydrocarbon feed stream comprises a crude oil.

3. The method of claim 1, wherein the hydrocarbon feed stream has a 50 wt. % boiling point of greater than or equal to 250° C.

4. The method of claim 1, wherein the heavy fraction comprises greater than or equal to 20 wt. % hydrocarbons having a boiling point of greater than 540° C.

5. The method of claim 1, wherein the heavy fraction has a boiling point of greater than or equal to 350° C.

6. The method of claim 1, wherein the aromatic feed stream comprises less than 20 wt. % naphthenes.

7. The method of claim 1, wherein the at least first catalyst in the first reactor comprises a metal selected from the group consisting of nickel, molybdenum, cobalt, alumina, and combinations of two or more thereof.

8. The method of claim 1, wherein the LHSV is less than 1.0 $h^{-1}$.

9. The method of claim 1, wherein a weight ratio of the hydrogen to the aromatic feed stream in the first reactor is from 500:1 to 1200:1.

10. The method of claim 1, wherein a pressure of the hydrogen in the first reactor during the contacting is of from 60 bar to 150 bar.

11. The method of claim 1, wherein a temperature of the first reactor during the hydrotreating is from 300° C. to 390° C.

12. The method of claim 1, wherein the mixed stream comprises greater than or equal to 20 wt. % naphthenes.

13. The method of claim 1, wherein a temperature of the second reactor during the hydrotreating is from 350° C. to 430° C.

14. The method of claim 1, wherein a liquid-hourly space velocity (LHSV) of the mixed stream to the one or more second catalysts in the second reactor is from 0.1 $h^{-1}$ to 1.0 $h^{-1}$.

15. The method of claim 1, wherein the second product effluent comprises greater than or equal to 40 wt. % hydrocarbons having a boiling point of from 350° C. to 540° C.

16. The method of claim 1, wherein the second product effluent comprises less than 25 wt. % hydrocarbons having a boiling point of greater than 540° C.

17. The method of claim 1, wherein the hydrotreating in the second reactor results in:
    a hydrodesulfurization rate of greater than or equal to 70%;
    a hydrodenitrogenation rate of greater than or equal to 20%;
    or both.

18. The method of claim 1, wherein the light fraction has a boiling point of less than 350° C.

19. The method of claim 1, wherein:
    the LHSV is less than 1.0 $h^{-1}$;
    a weight ratio of the hydrogen to the aromatic feed stream in the first reactor is from 650:1 to 1200:1;
    a pressure of the hydrogen in the first reactor during the hydrotreating is from 60 bar to 150 bar;
    a temperature of the first reactor during the hydrotreating is from 300° C. to 390° C.; and
    the aromatic feed stream comprises light cycle oil.

20. A method of upgrading a hydrocarbon feed stream, the method comprising:
    separating the hydrocarbon feed stream into a heavy fraction and a light fraction;
    hydrotreating an aromatic feed stream with at least a first catalyst in a first reactor comprising hydrogen to produce a first product effluent;
    combining the heavy fraction with at least a portion of the first product effluent to form a mixed stream; and
    hydrotreating the mixed stream with one or more second catalysts in a second reactor comprising hydrogen to produce a second product effluent;
    wherein:
        the aromatic feed stream comprises greater than or equal to 50 wt. % aromatics;

the aromatic feed stream comprises light cycle oil;
a liquid-hourly space velocity (LHSV) of the aromatic feed stream to the first catalyst in the first reactor is from $0.2\ h^{-1}$ to $2.0\ h^{-1}$;
the first product effluent comprises less than 50 wt. % aromatics; and
the first product effluent comprises greater than or equal to 20 wt. % naphthenes.

* * * * *